Jan. 26, 1960     T. R. FITCH     2,922,468
TIRE BEAD BREAKER
Filed Aug. 1, 1958     2 Sheets-Sheet 1
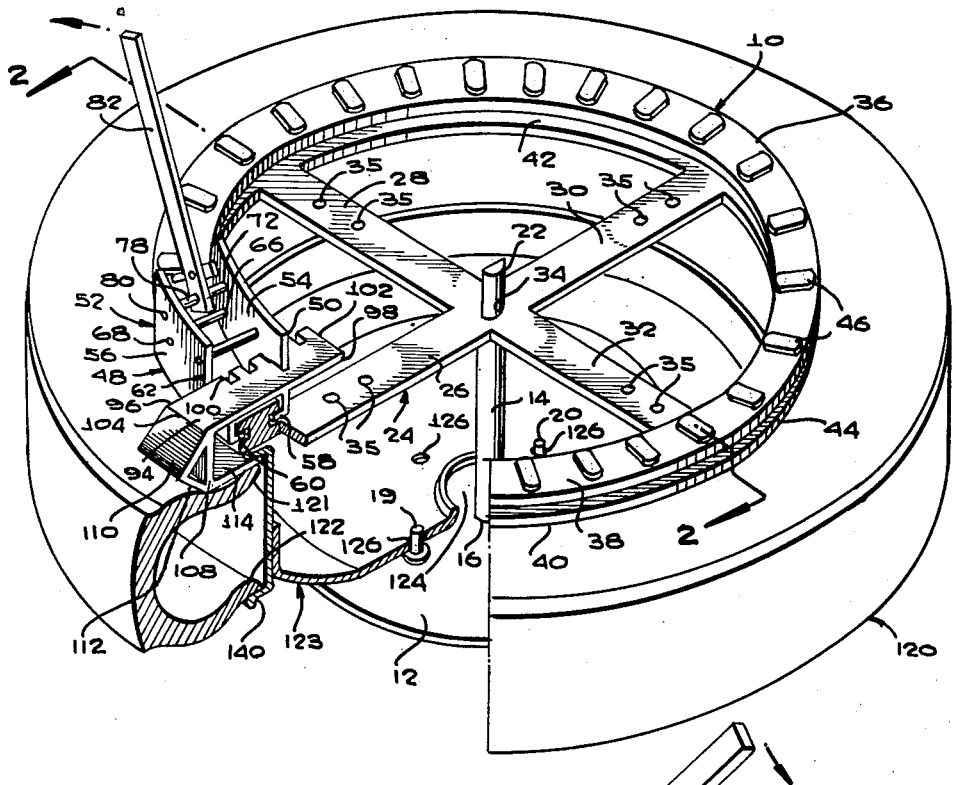
INVENTOR.
THEODORE R. FITCH
BY
McMorrow, Berman & Davidson
ATTORNEYS Jan. 26, 1960  T. R. FITCH  2,922,468
TIRE BEAD BREAKER
Filed Aug. 1, 1958  2 Sheets-Sheet 2
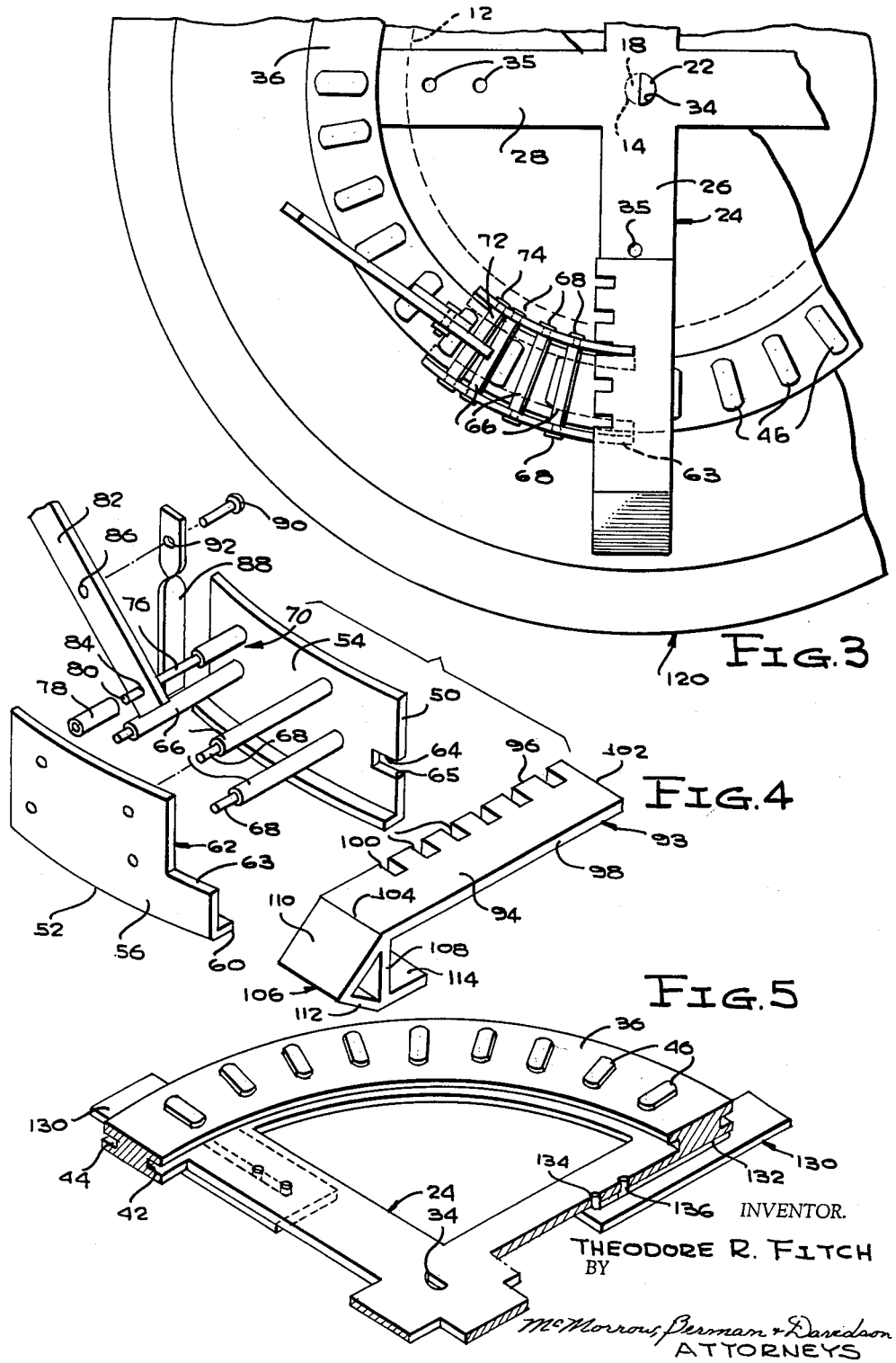
INVENTOR.
THEODORE R. FITCH
BY
McMorrow, Berman & Davidson
ATTORNEYS

United States Patent Office 2,922,468
Patented Jan. 26, 1960

2,922,468

TIRE BEAD BREAKER

Theodore R. Fitch, Pawhuska, Okla.

Application August 1, 1958, Serial No. 752,472

3 Claims. (Cl. 157—1.22)

This invention is directed to a device utilized to separate the "bead" portion of a tire from the wheel rim to which it has adhered during use. These devices are commonly known to those skilled in the art as "bead breakers."

Objectives

In dismounting an uninflated pneumatic tire from a wheel rim, often the most laborious and time-consuming step of the process is the separation of the bead portion of the tire from the wheel rim. This invention encompasses an improved apparatus for performing this function.

Among the objects of this invention is the provision of a tire bead breaker which is readily usable on all types of tires and rims, but is especially adapted, by reason of the improved construction thereof, for use on relatively heavy duty truck and bus tires.

Another object and advantage of the tire bead breaker contemplated by this invention is that the improved construction of this bead breaker permits the adjustment of the apparatus for use on tires and rims of variable diameters and thicknesses.

A further object is the provision of a tire bead breaker having means whereby, by application of the principle of leverage, a relatively greater amount of force can be brought to bear upon the bead of the tire than is possible with presently known apparatuses of this general description.

Still another object is the provision of a tire bead breaker comprising a base portion, a central axis member extending upwardly from the base, an annular rim member having a series of spaced protuberances formed thereon, and bead depressing means positioned for rotation around the rim.

Additional advantages attendant to this apparatus are the provision of a bead breaker of the class described supra, the bead breaker being noncomplex in construction and assembly, inexpensive to manufacture, and durable in use.

Other and further objects and advantages will become more readily apparent from a consideration of the following drawings when read in conjunction with the following description.

Description of the figures of the drawings

Figure 1 is a perspective view of a tire bead breaker constructed and assembled in accordance with the teachings of this invention, showing the apparatus mounted for operation on a tire rim, a portion of the tire and rim being in detail cross section in order to more clearly illustrate the construction of the device;

Figure 2 is a fragmentary enlarged transverse cross sectional view taken substantially on the vertical plane of line 2—2 of Figure 1, looking in the direction of the arrows;

Figure 3 is a fragmentary top plan view of the apparatus shown in Figure 2;

Figure 4 is an exploded perspective view of the bead depressing means assembly; and Figure 5 is a perspective view of one quadrant of the annular rim member of the device, showing the extension means thereof in their operative positions.

Description

Proceeding now to relate the several figures of the drawings to a more specific description of the tire bead breaker, it will be seen that reference numeral 10 is applied to the breaker, in general. The bead breaker 10 comprises a substantially discoidal base 12 formed, as are all of the components of the apparatus, of a heavy gauge steel or an equivalent material. The base 12 has a substantially cylindrical, stationary, upright axis member 14, provided with opposed ends 16, 18, the end 16 thereof being fixedly secured substantially at the center of one side of the base 12. A pair of substantially cylindrical upright locking pins 19, 20 also project vertically from the aforementioned side of the base 12, on diametrically opposed sides of the axis 14.

The end 18 of the axis 14 is provided with an integrally formed, elongated extension 22 which is semicylindrical in configuration. This semicylindrical configuration of the extension 22 is provided in order to afford non-rotatable connection thereof with a substantially flat cross member 24, the cross member 24 having radially extending arms 26, 28, 30, 32, and having a semi-circular transverse opening 34 formed substantially at the center thereof for reception of the extension 22.

The cross member 24 also has a plurality of transverse apertures 35 for a purpose more fully described in the portion of this specification dealing with means for extending the apparatus for use on a wheel of larger size.

The cross member 24 is integrally formed, as by casting, with an annular rim member 36 having an upper side 38 and a lower side 40. The rim 36 also has a pair of opposed inner and outer channel shaped circumferential grooves 42, 44, formed therein for a purpose described below.

A series of spaced protuberances 46 are provided on the upper side 38 for a purpose described infra, in dealing with the application of force to break the bead.

The bead depressing means assembly of the device 10 is identified by general reference numeral 48 and comprises a pair of substantially L-shaped arcuate plates 50, 52 having substantially rectangular side plate leg portions 54, 56 and elongated foot members 58, 60, respectively. As best illustrated in Figure 4, the side leg 56 has a substantially rectangular notch 62 cut from one end thereof, the notch 62 having a foot portion 63, while the opposed side plate leg 54 has a substantially rectangular slot 64 formed therein one edge 65 thereof being in substantially horizontal alignment with the notch 62. The plates 50, 52 are held in spaced relationship relative to one another by a plurality of elongated substantially cylindrical spacer members 66 fixedly secured to each of the plates by their respective necked-down, substantially cylindrical rivet forming ends 68.

A substantially cylindrical handle spacer 70 is positioned adjacent one end of the assembly 48 and includes a substantially cylindrical member 72 having a necked-down rivet forming end 74 and an opposed, elongated, substantially cylindrical end 76, best seen in the exploded view provided by Figure 4. A substantially hollow tubular sleeve 78 is normally fitted over the end 76 which is also used to secure the spacer 70 to the plate 52 by enlarging its outer end 80 in rivet fashion. A substantially rectangular handle member 82 having transverse openings 84, 86 is pivotally mounted on the spacer 70 by passing the end 76 through the opening 84 prior to insertion of the end 76 into the tubular sleeve 78.

An elongated substantially rectangular force applying lever 88 is pivotally connected in side-by-side relation with respect to the handle 82 by means of a rivet 90 which passes through an opening 92 formed adjacent one end of the lever 88 and the opening 86 in the handle 82. To serve a function described below, the other end of the force applying lever 88 is bent or twisted to extend substantially perpendicular to the above mentioned one end thereof.

The bead breaking unit 93 includes a substantially rectangular plate 94, having opposed sides 96, 98, the side 96 having a plurality of slots 100 formed therein, which is releasably positioned at one end of the assembly 48, the releasable positioning being by way of engagement of a selected one of the slots 100 with the slot 64 in the plate 50.

The plate 94 also has opposed ends 102, 104. Formed integrally with, and depending from, the end 104 is an elongated substantially triangular member 106 having a base 108 and sides 110, 112, the base 108 being substantially in perpendicular relationship relative to the plate 94. A tire rim engaging tongue 114 of substantially rectangular shape projects from the base 108 and is substantially parallel to the plate 94.

To facilitate the breaking of the bead portions this invention contemplates the sequential use of two identically shaped bead breaking units 93 (only one being shown) differing only in the distance between the plate 94 and the tongue 114 to serve a function to be described.

In some cases, the diameter of the wheel may be such that the rim 36 coincides roughly with the circumference of the wheel rim. However, if the rim 36 should be of a lesser diameter than the circumference of the wheel rim, the substantially rectangular extensions 130 shown in Figure 5 are utilized. The extensions 130 are provided with a longitudinally extending strip 132 having a pair of vertically extending pins 134, 136 extending therefrom adjacent one end thereof.

*Operation*

The deflated tire 120 having a pair of bead portions 121, 122, to be removed from the wheel 123 is positioned on the base 12 with the axis 14 thereof projecting upwardly through the axle opening 124, and the locking pins 19, 20 projecting upwardly through a selected two of the bolt openings 126 of the wheel 123.

The cross member 24, rim 36, and assembly 48 are then placed in position by positioning the semicircular opening 34 in and around the extension 22, and dropping the rim 36 to contact with the flange 138.

In cases where the rim flanges 138 and 140 of the wheel 122 are of greater diameter than the rim 36 of the apparatus 10, the rectangular extensions 130 are mounted on the cross members 24 as described above, thus providing support on the wheel rim flange 138 for the rim 36.

After choosing some random portion of the tire 120 as a starting point, the tire is then struck at this point with a hammer or other tool adjacent the bead 121, thereby breaking the bead away from the rim at this one point. The bead breaking assembly 93 is then utilized in the following manner: The plate 94 thereof is connected to the elements 50, 52 by the alignment and forced interdigital engagement of a selected pair of the slots 100 with the slot 64 of element 50 and with the notch 62 of element 52. The lever 88 is positioned behind the nearest subjacent protuberance 46 and upward force is applied to the handle 82. Thus, the handle 82 is pivoted in relation to the lever 88 and the assembly 48 moves against the plate 94 causing the tongue 114 to separate the next succeeding portion of the bead 121 from the wheel rim flange 138 in initiating the breaking of the bead.

After the unit 93 has traveled one complete circle around the rim 36, the original unit 93 is removed and the second one thereof having the greatest distance between the plate 94 and tongue 114 is substituted therefor. The operation described above is then repeated to complete the breaking of the bead.

When the situation arises wherein the extensions 130 are utilized, it is obvious that the plate 94 may be similarly extended by merely utilizing a different one of the slots 100 formed therein for connection with the slot 64.

Having described and illustrated a single embodiment of this invention, it will be understood that this embodiment is offered merely by way of example, and that this invention is to be limited only by the scope of the appended claims.

What is claimed is:
1. A tire bead breaker comprising a base portion, a central axis member extending substantially perpendicularly from one side of said base portion, an annular rim member having a series of spaced protuberances formed thereon, means for connection of said rim member with said axis member comprising a cross-member having an opening therein for nonrotatable reception of said axis member, a bead depressing assembly positioned for rotation around said rim, said assembly including a pair of substantially L-shaped arcuate plates having substantially rectangular vertical side plate leg portions and elongated horizontally opposed foot portions, means securing said arcuate plates in side-by-side spaced relationship, said opposed foot portions being journaled for travel in a pair of channel shaped grooves extending internally around the inner and outer circumference of said annular rim member, one of said arcuate plates having a substantially rectangular notch cut from one end thereof, the other of said arcuate plates having substantially rectangular slots formed therein, one leg of said notch being in horizontal alignment with one edge of said slot, a substantially rectangular plate engageable with said notch and said slot and having a substantially triangular member secured thereto to depend from one end thereof, a rim engaging tongue extending radially inwardly from said triangular member and being substantially parallel to said plate, a handle member pivotally mounted to said means connecting together said arcuate plates, a force applying lever pivotally mounted on said handle and engageable with said spaced protuberances of said rim member, whereby the pivotal movement of said force applying lever and said handle member causes said tongue to move circumferentially around said rim member when placed on a wheel to separate the rim of said wheel from a tire bead.

2. A tire bead breaker as defined in claim 1 wherein the outer ends of said cross member are provided with adjustable detachable extensible means whereby said bead breaker may be utilized in connection with a vehicle wheel having a greater circumference than said rim member.

3. A tire bead breaker comprising a base portion, an axis member extending substantially perpendicularly from said base, an annular rim member, means non-rotatably connecting said rim member with said axis member at a point spaced from said base member, a bead depressing assembly operatively engaged with said rim, said last named assembly including a pair of vertically extending spaced apart arcuate plates having means extending therebetween to connect together said plates and to engage on opposed edges of the annular rim, a wedge member secured to adjacent ends of said plates, said wedge member extending radially outwardly from said rim and depending therefrom in the direction of said base, a radially inwardly directed tongue on the depending portion of said wedge member, leverage means secured on said connecting means, said leverage means cooperatively engaging with any selected one of a series of coacting means on said annular rim to advance said bead depressing means in one direction relative to said rim.

References Cited in the file of this patent

UNITED STATES PATENTS

| | | |
|---|---|---|
| 2,556,024 | Bourdon et al. | June 5, 1951 |
| 2,615,507 | Wendelken | Oct. 28, 1952 |

FOREIGN PATENTS

| | | |
|---|---|---|
| 139,688 | Great Britain | Mar. 11, 1920 |